United States Patent
LeBlanc

(10) Patent No.: US 7,254,120 B2
(45) Date of Patent: Aug. 7, 2007

(54) DATA RATE CONTROLLER

(75) Inventor: Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 1033 days.

(21) Appl. No.: 10/083,053

(22) Filed: Feb. 26, 2002

(65) Prior Publication Data
US 2002/0114285 A1 Aug. 22, 2002

Related U.S. Application Data

(63) Continuation-in-part of application No. 09/522,185, filed on Mar. 9, 2000, which is a continuation-in-part of application No. 09/493,458, filed on Jan. 28, 2000, which is a continuation-in-part of application No. 09/454,219, filed on Dec. 9, 1999.

(51) Int. Cl.
H04B 7/216 (2006.01)
(52) U.S. Cl. ........................ 370/335; 455/422; 370/252
(58) Field of Classification Search ..................... None
See application file for complete search history.

(56) References Cited

U.S. PATENT DOCUMENTS

| | | | | |
|---|---|---|---|---|
| 5,608,450 A | * | 3/1997 | Agarwal et al. | 348/14.15 |
| 5,742,640 A | * | 4/1998 | Haoui et al. | 375/220 |
| 6,044,485 A | * | 3/2000 | Dent et al. | 714/774 |
| 6,324,503 B1 | * | 11/2001 | Manjunath et al. | 704/226 |
| 6,452,941 B1 | * | 9/2002 | Bruhn | 370/468 |
| 6,529,730 B1 | * | 3/2003 | Komaili et al. | 455/452.2 |
| 6,985,497 B2 | * | 1/2006 | Hsu et al. | 370/477 |

FOREIGN PATENT DOCUMENTS

| | | |
|---|---|---|
| EP | 1024638 A1 | 1/2000 |
| EP | 1079573 A2 | 1/2000 |

OTHER PUBLICATIONS

Paksoy, E. et al.: "Variable Rate Speech Coding For Multiple Access Wireless Networks" 1994 pp. 47-50.

* cited by examiner

*Primary Examiner*—Chi Pham
*Assistant Examiner*—Phuc Tran
(74) *Attorney, Agent, or Firm*—McAndrews, Held & Malloy, Ltd.

(57) ABSTRACT

The present invention provides a data rate controller system for determining the coder used, and hence the data rate, for a plurality of channels in an associated network. Each channel provides statistical information about an associated signal to a central controller (or call/resource manager). The controller considers the information and sends control instructions to each channel for selecting an appropriate coder and/or data rate. The statistical information might include lost-frame rate, jitter, call event discrimination, and system resource utilization. By considering each channel from a centralized standpoint, the network can be optimized according to network capabilities and channel resource capabilities. A profile might also be used where each channel autonomously chooses a coder based upon background noise derived from the source signal.

5 Claims, 7 Drawing Sheets

DATA RATE CONTROLLER

RELATED APPLICATIONS

The present application is a continuation-in-part of co-pending U.S. patent application Ser. No. 09/522,185, filed Mar. 9, 2000, which is a continuation-in-part of co-pending application Ser. No. 09/493,458, filed Jan. 28, 2000, which is a continuation-in-part of co-pending application Ser. No. 09/454,219, filed Dec. 9, 1999, priority of each application which is hereby claimed under 35 U.S.C. § 120. All these applications are expressly incorporated herein by reference as though set forth in full.

FIELD OF THE INVENTION

The present invention provides a system to control the data rate used by an end device in order to manage available resources and provide sufficiently high voice quality. In particular, the device might exist on a network with other such devices, and the data rates of each will be managed.

BACKGROUND OF THE INVENTION

Internet protocol (IP) networks, and the like, for providing data communication among a plurality of computers are well-known. Such networks facilitate the transfer of data files, audio information and video information, as well as any other information that may be represented in binary form among the plurality of computers.

Networks can be conveniently divided into two broad categories, based upon their size. A local area network (LAN) is a group of computers which is connected so as to facilitate the sharing of applications, data and peripherals. Local area networks are generally confined to a single building or a small group of buildings.

A wide area network (WAN) is made up of a plurality of LANs which is connected together so as to facilitate communication therebetween. A WAN may cover a city, a state, a country or even be international in scope. The Internet is an example of a WAN that includes more than 2,000 separate packet-switched networks that are located all over the world.

The popularity of networks, such as the Internet, has increased the desire for additional network services, such as network telephony. The vast, high bandwidth network provides an ideal medium for audio communications. The nature of such telephone devices is to process voice signals that might come in over the network, typically as digital packets of information, or the like. To process such signals, various computing and processing devices are used, typically in the form of integrated circuit configurations. These devices are often capable of handling multiple channels of information. Alternatively, multiple channels might be processed using multiple devices distributed across a network.

For telephony and voice applications, packet-based networks are becoming more widely used. In the past, it was often difficult to guarantee sufficient bandwidth or a certain "quality of service" that might be needed to accommodate real-time voice signals (that are broken into packets). However, known solutions have been developed which address various problems associated with transmitting voice over packet networks, including, for instance, voice over IP (Internet Protocol), voice over ATM (asynchronous transfer mode), and voice over frame relay.

Prior art solutions include voice coders (i.e., particularized hardware and software devices) that can be applied to packet-based voice systems. Voice coders are configured to process and encode incoming voice signals at certain data rates. In general, if a higher data rate is used (i.e., more voice samples are taken), then the voice coder does not need to be as complex. In other words, fewer hardware components might be employed, or the software associated with the device might be less complex. Conversely, if a lower data rate is used, the voice coder is generally more complex since more compression needs to be performed on the signal.

This data rate can be varied, depending upon the input signal or source being supplied to the device. For such devices, the term variable bit rate (VBR) has been defined as follows: A VBR encoder outputs a bit stream which may have a variable number of bits in successive frames. That is, each frame may contain a different number of bits relative to the last frame. Bit-rates may vary, for example, in large predefined increments/decrements, or the bit-rates may vary by as little as one-bit resolution. The variability in bit rate may be either network controlled or source controlled according to the input audio signal.

Source controlled rate (SCR) devices use the source to vary the bit rate. For instance, during a normal telephone conversation, the participants alternate speaking so that, on average, each direction of transmission is occupied 50% of the time. SCR is a mode of operation where the speech encoder encodes speech frames containing only background noise with a lower speech rate than might be used for encoding speech. A network may also vary its transmission scheme to take advantage of the varying bit rate. Benefits provided therein include: (a) increases battery life and/or reduces power consumption of the associated processing system, and (b) the average required bit-rate is reduced, thereby leading to a more efficient transmission with decreased load and hence increased capacity.

Encoders conform to various standards proposed through the International Telecommunication Union (ITU) and European Telecommunications Standards Institute (ETSI). The ITU Telecommunication Standardization Sector (ITU-T) is one of the three Sectors of the ITU. The ETSI focuses moreso on European standards. The mission of the ITU and the ETSI is to ensure efficient production of high quality standards covering certain fields of telecommunications. Table 1 (ITU) and Table 2 (ETSI) show certain representative encoding standards:

TABLE 1

ITU-T Standard Encoders

| Name | Annex (if appropriate) | Approximate data rate(s) |
|---|---|---|
| G.728 |  | 16 Kbps/12.8 Kbps |
| G.729 | A | 8 Kbps |
|  | B | VAD |
|  | D | 6.4 Kbps |
|  | E | 12.8 Kbps |
| G.711 |  | 64 Kbps |
| G.726 |  | 16/24/32/40 Kbps |
| G.723.1 |  | 6.3 Kbps |
|  |  | 5.3 Kbps |
|  | A | VAD (voice activated device) |

TABLE 2

ETSI - Standard encoders

| | |
|---|---|
| GSM-AMR | 4–12 Kbps |
| GSM-FR/EFR | 13 Kbps |
| GSM-HR | 6.4 Kbps |

These representative encoders are part of a growing list of standards, with each different device being used according to its specification of abilities for a given situation. For instance, G.728 is an international voice compression standard from ITU and has rapidly gained acceptance for many applications including: satellite, cellular, and video-conferencing systems. G.728 is specified as part of the H.320 international video-conferencing standard. One reason for its rapid acceptance is that G.728 delivers the same toll-quality voice as 32 Kbps ADPCM (adaptive differential pulse-code modulation), but in only half the bandwidth. Note that ADPCM is a technique for converting sound or analog information to binary information (a string of 0's and 1's) by taking frequent samples of the sound and expressing the value of the sampled sound modulation in binary terms.

Referring to FIG. 6 of the above-incorporated references entitled "Voice and Data Exchange over a Packet Based Network with Resource Management," and "Voice and Data Exchange over a Packet Based Network," respectively, the encoders would be located within the voice encoder block 82. The encoders would be implemented via either hardware and/or software, depending upon the configuration that was implemented.

Certain members of this group of representative encoders are known to incorporate various aspects of SCR. For instance, the ETSI GSM-AMR coder is source controlled, as well as Qualcom's QCELP coder, and certain VAD-Speech coder combinations. Network management systems in current use will normally manage network bandwidth by downspeeding endpoints during congestion. However, the various members of this overall collection of encoders are not believed to use a collection (or combination) of statistical information—that might be derived from the network (i.e., the devices in the network and the associated connections) and the source—in order to arrive at a data rate decision. It is one important aspect to collectively consider the data rate needs of all of the devices in the network. It is also an important aspect to have a system that can adjust the rates of each device to thereby create a more efficient throughput of data across the entire system.

Accordingly, what is needed in the field is central controller coupled with a network of devices which can monitor statistical information (or the like) associated with each network device. The information might be considered alone or in combination with other information and thereby adjust the data rate of each device based upon such statistical information.

SUMMARY OF THE INVENTION

The present invention provides a system for adjusting the data rates of various channels within a network of devices. Each channel within a device runs a coder that conforms to certain standards, depending upon what particular coding functions the channel is supposed to perform (i.e., voice, data, FAX, etc.). Moreover, certain coders perform better under different adverse conditions, such as noise, jitter, lost packets, etc. Among other things, the different coders can operate at different data rates. Selection of the appropriate coder for the situation provides for selection of an appropriate data rate.

The present invention includes a call/resource manager (or central controller) that receives statistical information from a plurality of channels associated with the manager. The channels provide statistical information to the manager about the inbound/outbound signal, the channel resources, and/or the network resources. This information might involve certain factors in order to make a coder (i.e., data rate) decision. These factors include, but are not limited to, estimated lost packet rate, estimated jitter in the network, estimated background noise level, estimated network utilization, and estimated process utilization. The corresponding information would be provided by devices such as a lost frame rate estimator or a jitter estimator in a voice synchronizer, a jitter estimator in a voice synchronizer, a call discriminator, and/or resource information (from the network or from the channel processors). These information-providing devices might be sub-components of an overall system, such as a network telephony device or the like.

The manager thereby monitors statistics and events from each channel and thereafter generates control instructions to be sent to a portion (or all) of the channels. For instance, if a high lost frame rate is indicated, a switch can be made on some or all of the channels to a lower rate coder. In an illustrative embodiment, if a high lost frame rate is indicated, the packetization interval is reduced. This should reduce network congestion, as well as the high frame loss condition. A lower-frame lost condition will improve voice quality. If a high jitter rate is detected, then instructions can be given to downspeed all or some of the channels. This should relieve congestion on the network, which should improve jitter performance. If a call discriminator detects a certain type of call, then the manager might also consider network utilization and/or system resource utilization in order to switch from one mode to another mode (i.e., voiceband data mode to FAX relay mode). Background noise might also be used by a channel to derive an upspeed request, which will be considered by the manager/controller in light of network utilization and resource utilization.

Still another embodiment might utilize channels that can autonomously switch to any of a number of coders that comprise a set for that channel. The network will thereby have profiles that must be satisfied for each network path. Based upon background noise (or the like), the channel will switch to a preferred coder. After each coder is selected, the network requirements will be satisfied according to the determined profiles that were used to determine the set of coders for each channel.

Accordingly, one aspect of the present invention provides for a data rate controller system for providing control instructions to a plurality of channels on corresponding channel devices operating on a network. The system includes at least one channel that provides statistical information about the associated channel signal. The system also includes at least one coder and a central controller. Each coder provides for running at a certain data rate on each channel device. The central controller interacts with the plurality of channels. Statistical information about each channel signal is used by the central controller to determine the type of coder that should be run on each channel device. The central controller sends a control instruction to each channel to facilitate implementation of the coder.

Another aspect of the present invention provides for a data rate controller system for providing control instructions to a plurality of channels on corresponding channel devices operating on a network. At least one channel has means for detecting background noise conditions, and means for providing channel resource utilization and associated network utilization information for each channel. At least one coder runs at a certain data rate on each channel device. A central controller interacts with the plurality of channels. The noise conditions and the resource and network utilization information, from each channel, are used by the central controller to determine the type of coder that should be run on each channel device. The central controller sends a control instruction to each channel to facilitate implementation of the coder.

Still another aspect of the present invention provides for a data rate controller system for allowing a plurality of channels on a network to each select a channel coder that fits an associated network profile. The system includes a network of channels having a plurality of connections. The network forms a profile of allowed data rates that might flow across the connections. A set of coders is associated with each channel on the network. A device is associated with each channel for detecting source information. The source information is used by each channel to select an appropriate coder from each set of coders, with each channel thereafter satisfying the profile.

It is understood that other embodiments of the present invention will become readily apparent to those skilled in the art from the following detailed description, wherein shown and described are only example embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Certain aspects and advantages of the present invention will be apparent upon reference to the accompanying description when taken in conjunction with the following drawings, which are exemplary, wherein.

DESCRIPTION OF THE PREFERRED EMBODIMENTS

The present invention is described below in terms of certain preferred embodiments and representative applications. The examples provided are intended to be used with any communication system that would benefit from having a controller that can control the data rates used by various devices in a network or system. The controller will be used to monitor and interpret various statistical information pertaining to the network and its interconnected devices. While a certain set of examples is presented in terms of what statistical information to use, any of a variety of other statistical information might also be considered and used to adjust the data rates of the various networked devices.

The present invention is also intended to apply to voice over packet networks, including, but not limited to, Voice over IP (VoIP), Voice over ATM (VoATM), voice over frame relay and cellular/wireless/PCS networks. The present invention describes certain methods involved in performing the switch. Certain representative factors are also described, which can be used in making the data rate decision. These factors include, but are not limited to, the following: (1) estimated lost packet rate, (2) estimated jitter in the network, (3) estimated background noise level (i.e., source statistics), (4) estimated network utilization, and/or (5) estimated processor utilization (either committed or observed).

According to such statistics, a system is provided to control the rate of an end device in order to manage resources available and thereby obtain a high voice quality across each device in the network. These statistics can be broken down into source statistics and network statistics. Source statistics (i.e., background noise level and the like) are derived directly from the incoming signal and do not require any information from/about the other devices in a system. Network statistics, however, require the system to have a central manager, which manages all of the channels being aggregated onto a network. The central manager might similarly include a host, call manager, call agent, or the like. The manager will serve to monitor statistics and events from each channel and thereafter make rate (i.e., bandwidth) decisions based on a multitude of factors (including, for instance the factors 1-5 shown above).

Figure 1:
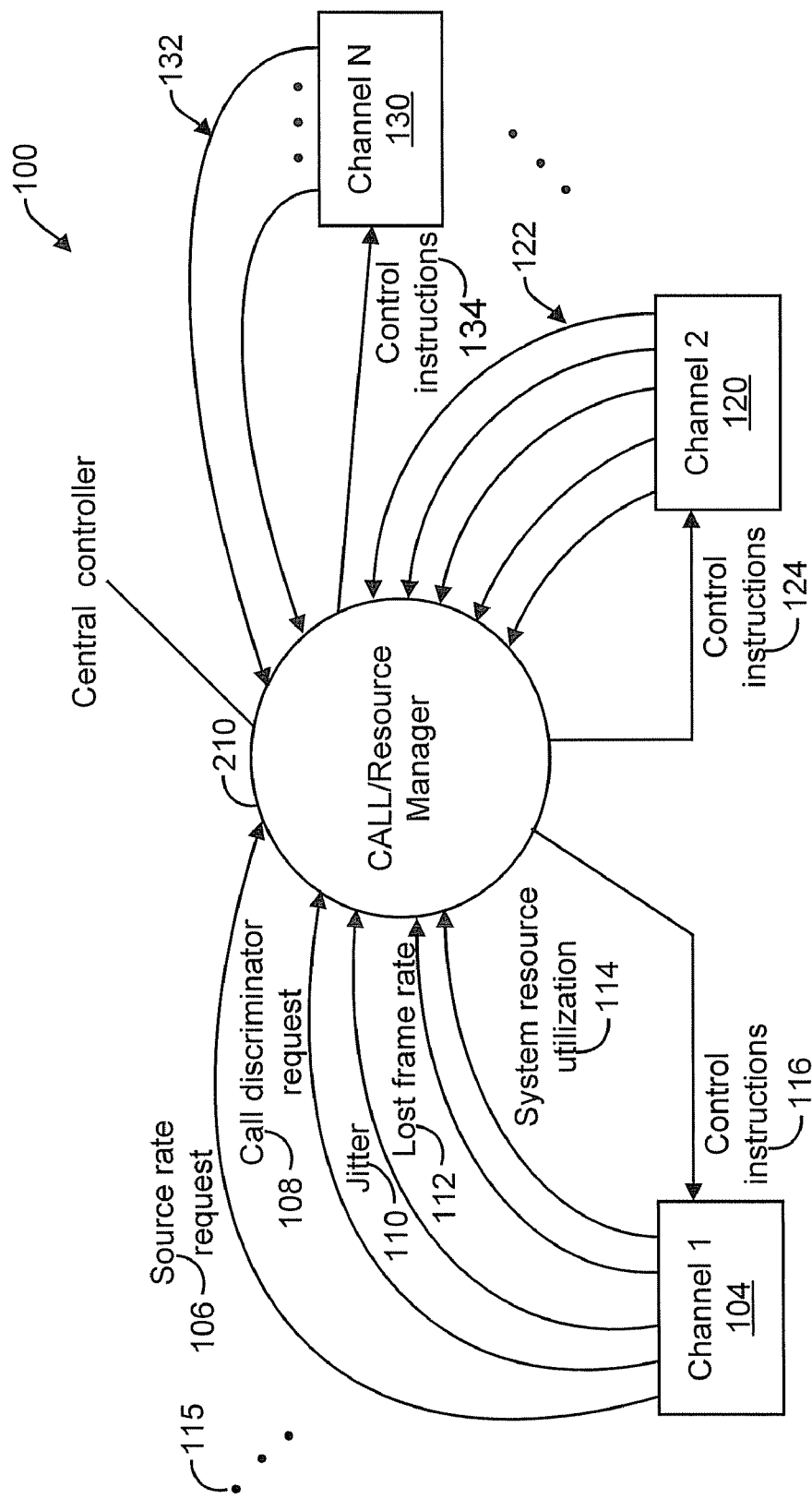
FIG. 1 is a representative block diagram, according to at least one aspect of the present invention, of the call/resource manager (or central controller) receiving statistical information from a plurality of channels and providing data rate instructions based upon this information.

FIG. 1 next shows an example data rate controller system 100. Note that each channel may reside on the same physical device or on multiple devices. The Call/Resource Manager (or central controller) 102 is shown receiving various signal information from a plurality of channels. Channel 1 (104) is shown to provide certain statistical information to the manager 102, including source rate request 106, call discriminator request 108, jitter 110, lost frame rate 112, and system resource utilization 114. The statistical information is not strictly limited to the elements shown and might include other information as indicated by the continuation indicator 115. The manager 102 uses this information to thereafter send control instructions 116 back to channel 1 (104). A second channel 120 is shown sending a similar set of information 122 to the manager 102 and then receiving control instructions 124 back from the manager 102. Any number of other channels might be included, up to and including channel N (130). Channel N also sends a similar set of information 132 back to the manager 102 and receives control instructions 134.

Representative examples are next described for utilizing each statistical piece of information listed above, namely Lost Frame Rate, Jitter, Call Discriminator Request, Estimated Background Noise, and Network Profile Support. The present invention is not intended to be strictly limited to these statistical pieces of information, as other forms of statistical information might also be used.

Lost Frame Rate (see FIG. 1, 112)—In a packet based system, frames of data are processed in a sequential fashion. Occasionally, frames are lost or dropped during the process. A lost frame can result in temporary loss of the voice and/or data signal over a transmission line. Generally, the lost frame rate is a measure (or estimate) of the amount of frames that might be dropped by a system and is often calculated as a percentage of the total amount of incoming frames.

Figure 2:
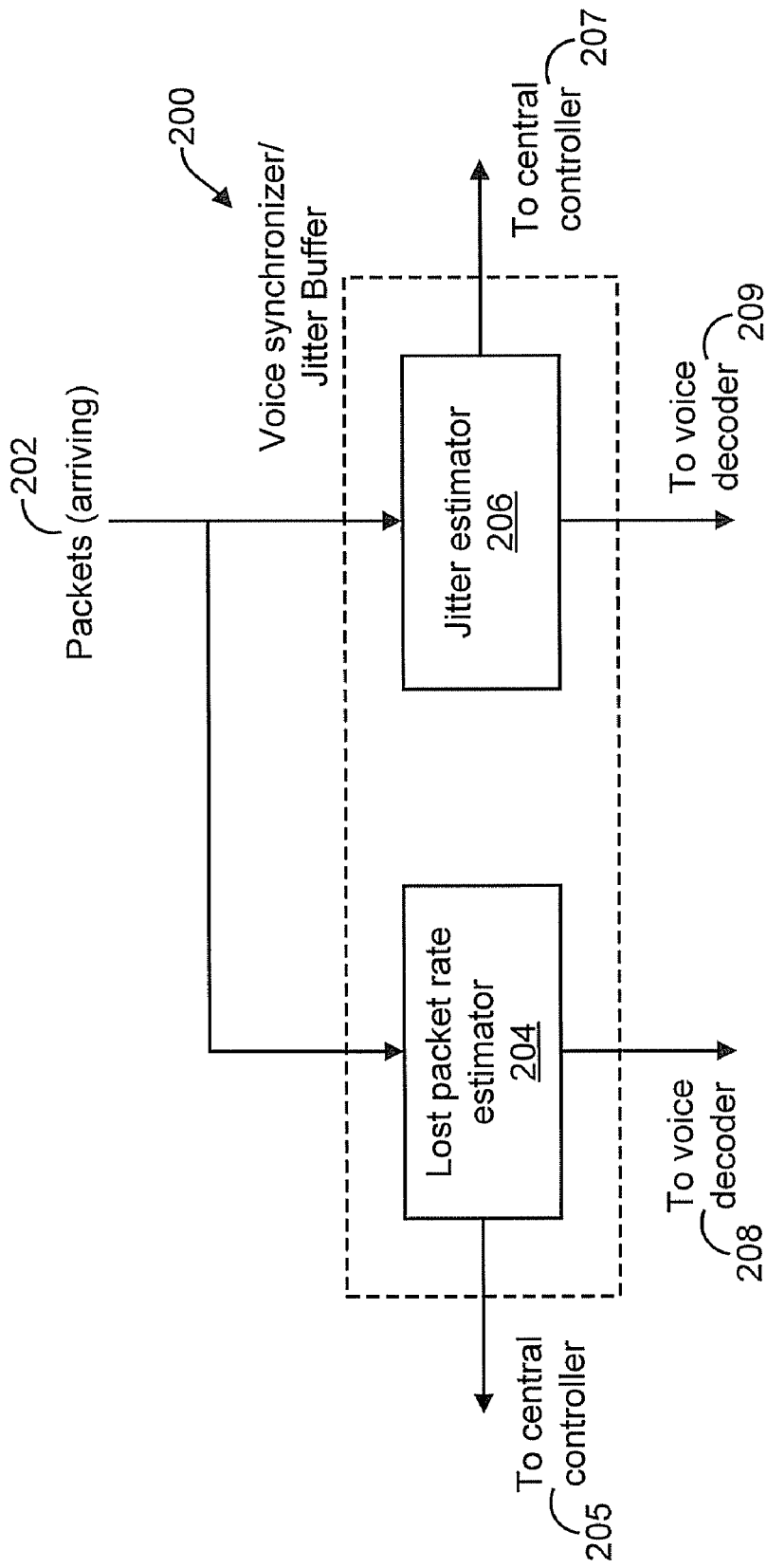
FIG. 2 is a block diagram, according to one aspect of the present invention, of a voice synchronizer/jitter buffer that might be contained in an overall system, having a lost packet rate estimator and a jitter estimator.

Referring again to FIG. 6 of the incorporated references entitled "Voice and Data Exchange over a Packet Based Network with Resource Management," and "Voice and Data Exchange over a Packet Based Network," respectively, the lost packet estimator will generally be included in the Voice Synchronizer block 90. FIG. 2 shows this device 200 configured as both a voice synchronizer and jitter buffer. The arriving packets 202 enter the device and are processed by both the lost packet rate estimator 204, as well as the jitter estimator 206. The result 205 from the lost packet rate estimator 204 will be used by the central controller (FIG. 1, 102) as a standard piece of statistical information. A jitter estimator 206 is also shown, with the result 207 also being used by the central controller 102. The respective results 208, 209 of each sub-part (204, 206) of the voice synchronizer/jitter buffer 200 are sent to the voice decoder (see FIG. 6, element 96 of the incorporated reference).

Figure 3:
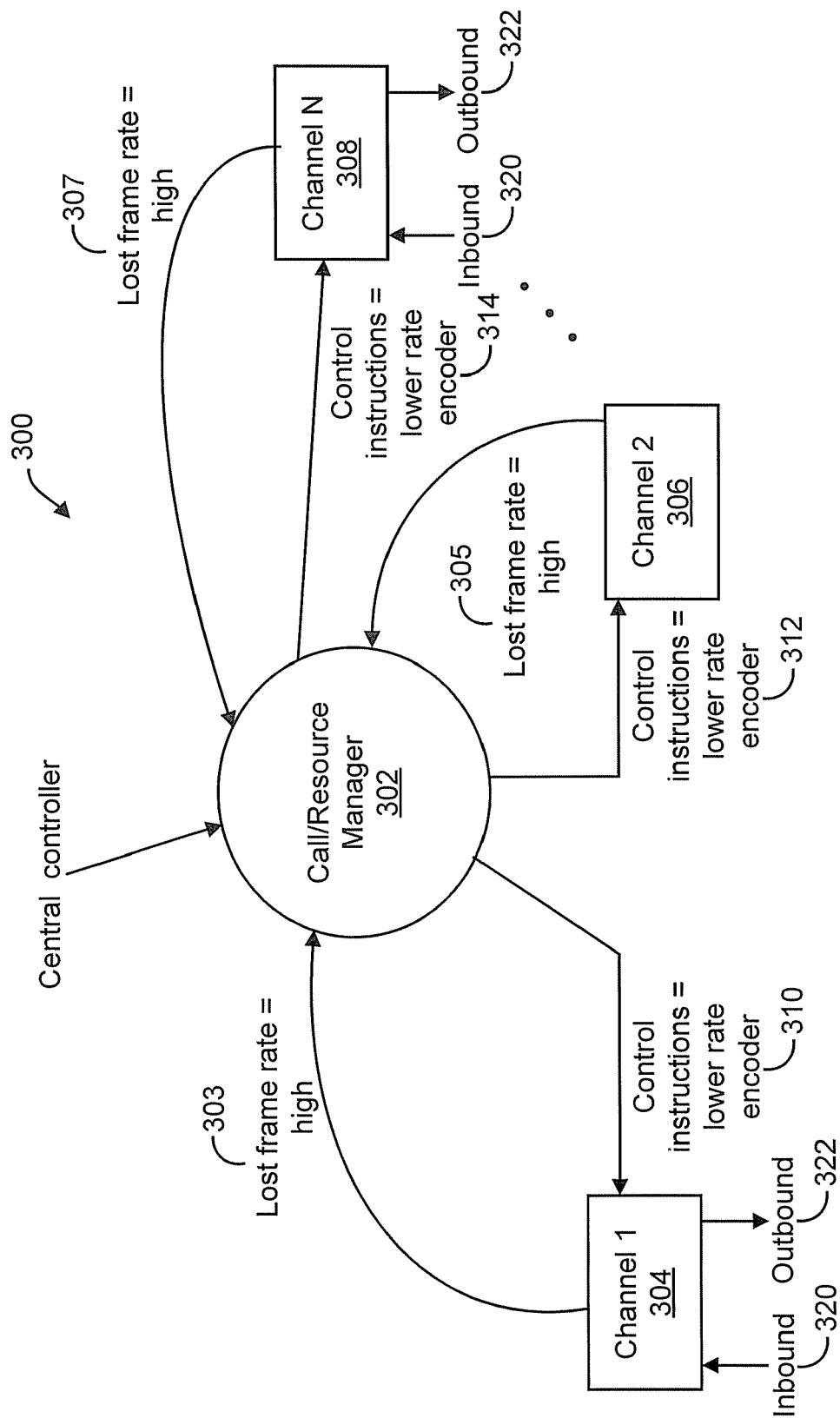
FIG. 3 is a block diagram, according to one aspect of the present invention, of a plurality of channels providing lost frame rate information to the call/resource manager, with control instructions returned based on this information.

39 According to one aspect of the present invention, if all of the channels are using a voice compression algorithm with low complexity (i.e., ITU-T standard G.711), and the lost frame rate is high on all channels (for instance >2%), then a switch should be made to a lower data rate encoder. FIG. 3 serves to illustrate such circumstances. The Call/Resource manager 302 is shown receiving lost frame rate information 303, 305, and 307 from each respective channel 304, 306, and 308. If each channel has a lower rate coder available—particularly a coder with better lost frame characteristics (i.e., G.729 Annex E at 11.8 kbps), then the resource manager 302 will send some form of control instructions (i.e., 310, 312, or 314, respectively) back to each appropriate channel. The instructions will dictate whether the coder rate should be switched on a portion of the channels, or on all channels, which are under the control of the manager 102.

By switching to a lower rate encoder, overall congestion on the network should be reduced. This is because the lower rate encoder pushes fewer bits out onto the transmission path (or network paths) for an equivalent amount of incoming voice/data signal. In turn, the lower rate should help to reduce the high frame loss condition. By lowering the frame loss rate, the voice quality will thereby be improved (despite using the lower rate encoder). In an illustrative embodiment of the present invention, if a switch is made to a lower rate encoder as a result of a high lost frame rate, a lower packetization interval is used, and this will minimize the temporal effect of a single lost frame.

In this example, the high-loss frame rate is detected on inbound channels. Note that each channel is shown to function as either an inbound 220 or outbound 222 signal. However, there may or may not be congestion on outbound channels. Accordingly, this system should also signal the call resource managers to send instructions to decrease the bandwidth used by the end devices (i.e., the devices employing the channel on the network).

Alternatively, the end devices might be configured to switch to a different voice coder when a change in the egress rate is detected. For instance, if the egress rate increases, then a higher rate coder might be used. Conversely, if a lower egress rate is detected, then a lower rate coder might be used. This would provide for maximum performance of voice quality in the system while accounting for bandwidth capabilities of the network and devices within the network.

Jitter (see FIG. 1, 110)—Jitter might be defined as the deviation in, or displacement of, timing of a digital signal. For instance, if a signal packet is expected at a certain time, and the packet comes in at a later time, then the jitter might be expressed as this time delay.

Causes of jitter include (among other things) processing delay, queueing of packets in network equipment, and different delays due to the possibly different paths packet take while traversing the network. In audio signals, jitter can introduce phase distortion or other undesired effects in the signal and loss of transmitted data between network devices. The amount of allowable jitter depends greatly on the application at hand.

Figure 4:
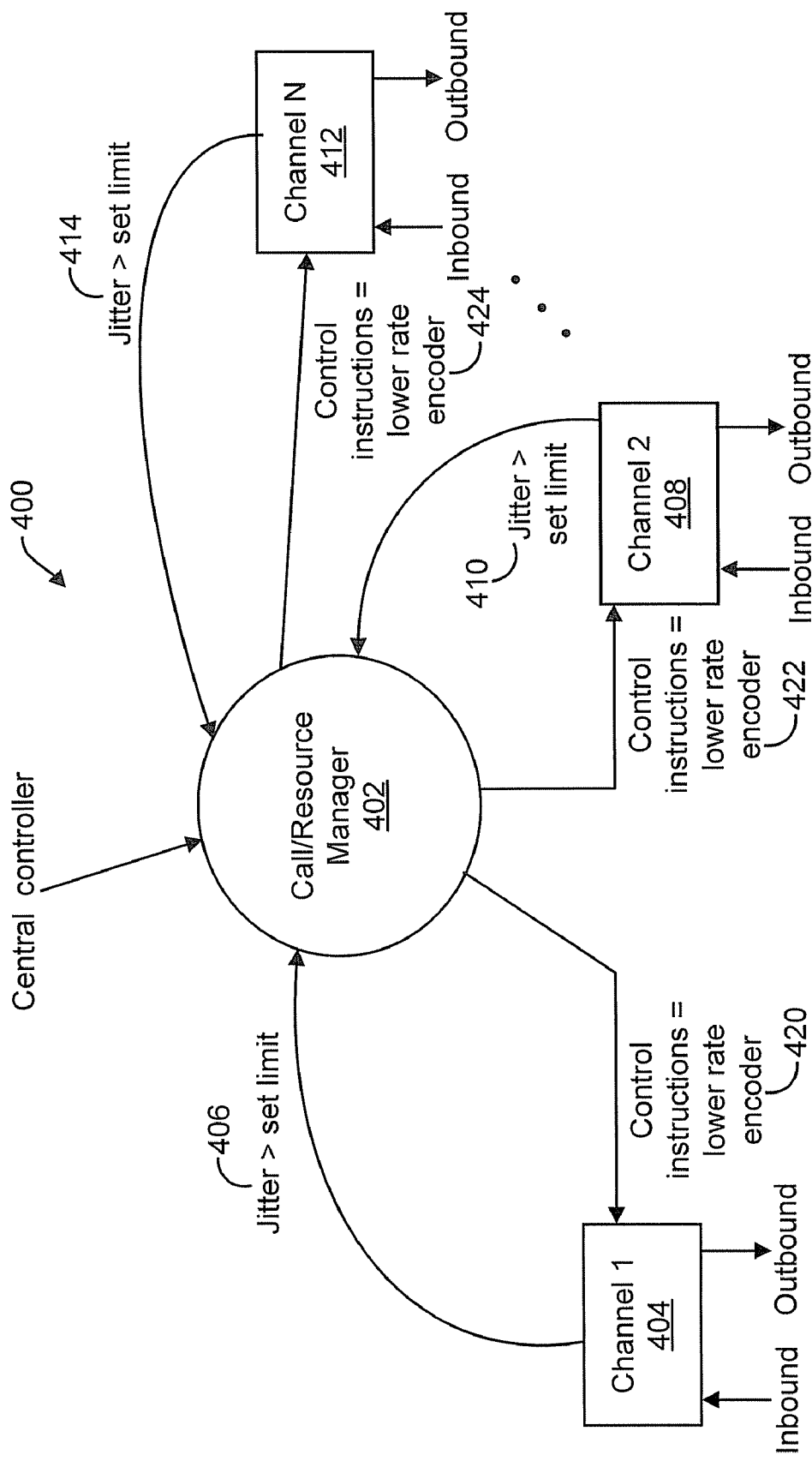
FIG. 4 is a block diagram, according to one aspect of the present invention, of a plurality of channels providing jitter information to the call/resource manager, with control instructions returned based on this information.

FIG. 4 next shows the system configuration 400 where the Call/Resource manager 402 receives jitter information from each channel. Channel 1 (404) is shown sending information to the manager 402, thereby indicating whether the jitter 406 is above a set limit or not. For instance, the set limit might test if the jitter is greater than 50 msec on some or all of the channels considered. Similarly, channel 2 (408) is shown sending jitter information 410 to the manager 402, and channel N (412) is shown sending jitter information 414 to the manager 402. Based upon the information gathered from all channels, the manager (or controller) 402 makes a decision to downspeed all or some channels to a lower data rate. This is shown as certain control instructions (i.e., 420, 422, and 424) being sent to facilitate lowering the encoder rate. One coder that might be used to satisfy the downspeed instructions includes the ITU-T standard G.726 running at 32 kbps. Using a coder at this data rate should serve to relieve congestion on the network. Less congestion will, in turn, subsequently improve the jitter performance.

Generally, the high jitter is detected on inbound packets 430. The rate change thereafter affects outbound packets 432. Similar to the end device described above, the system should also signal the call resource manager(s) 402 to decrease the bandwidth used by the end devices. Alternatively, the end devices could switch voice coders when an egress rate change is detected.

Figure 5:
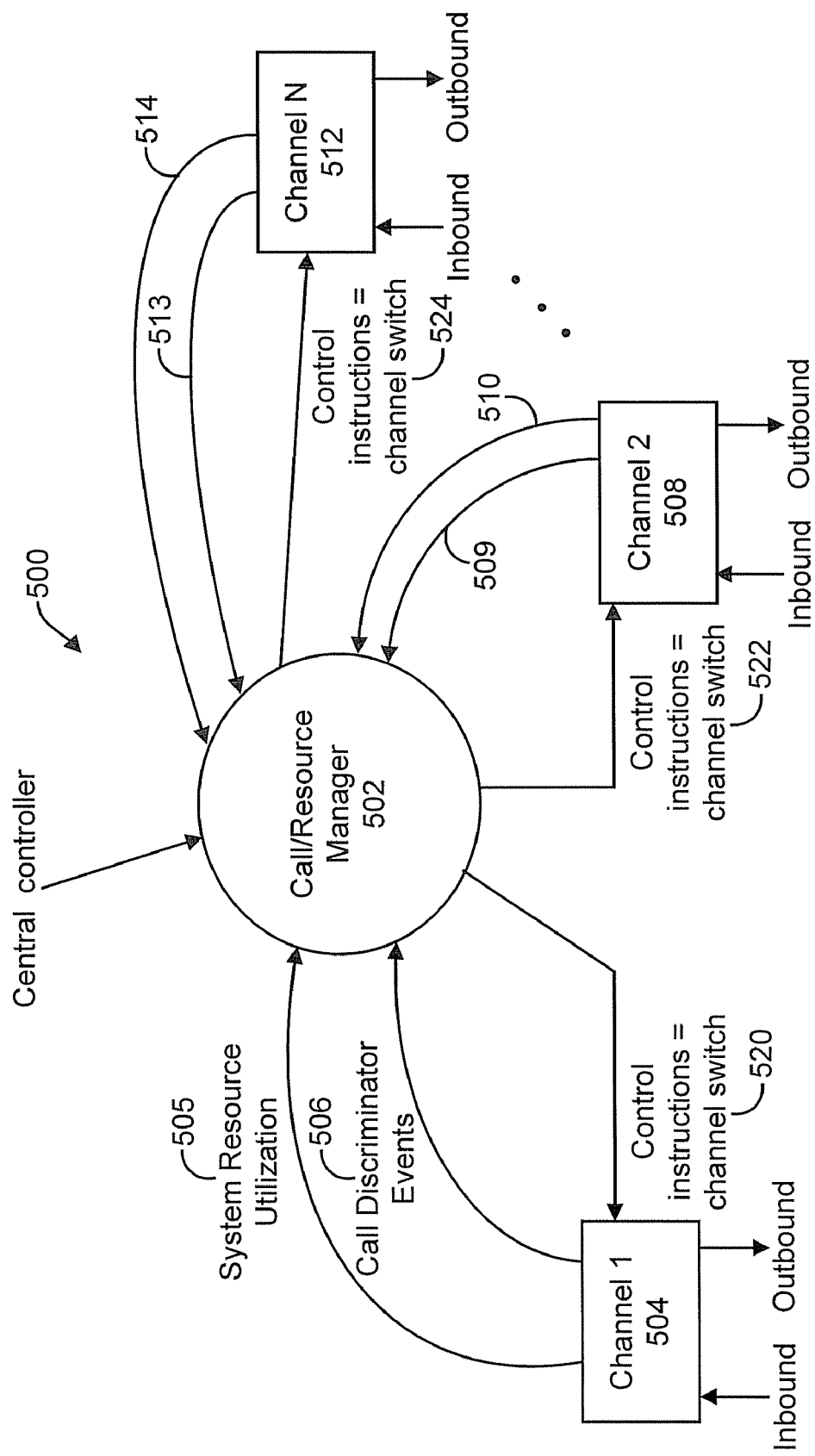
FIG. 5 is a block diagram, according to one aspect of the present invention, of a plurality of channels providing call discriminator event information and/or system resource utilization information to the call/resource manager, with control instructions returned based on this information.

Call Discriminator Request (see FIG. 1, 108), and System Resource Utilization (see FIG. 1, 114)—Elements 108 and 114 in FIG. 1 further show that information derived from a call discriminator, and system resource utilization, might also be used to adjust the data rate of the channels. A representative call discriminator is shown as element 68 in FIG. 6 of the incorporated references entitled "Voice and Data Exchange over a Packet Based Network with Resource Management," and "Voice and Data Exchange over a Packet Based Network," respectively. FIG. 5 of the present invention shows a representative system configuration 500 (as per the model of the previous examples). For example purposes only, channel 1 (504) might be assumed to be configured with a voice coder (i.e., G.729, or the like), and the call discriminator might thereafter detect a FAX call. The voice system running on channel 1 provides call discriminator events 506 to the controller/resource manager 502. Each channel also provides system resource utilization information 505 to the manager 502. Channels 2 (508) through N (512) also provide call discriminator events (510 and 514, respectively) and system resource utilizations (509 and 513, respectively) to the resource manager 502.

Based on network utilization and/or system resource utilization (505, 509, 513) (i.e., MIPs, memory, or the like), certain control instructions (or commands, 520, 522, and 524, respectively) are sent from the manager 502 to each channel 504, 508, and 512. The control instruction facilitates the channel switching from one mode to another. For this particular example, the mode might switch from a voice mode to a voiceband data mode. Such switching might include running a G.711 voice coder, and setting the jitter buffer to a non-adaptive mode. The channel switching might additionally facilitate switching to FAX relay.

As described above, a lower complexity encoder produces more bits and requires more bandwidth in order to send data. A high complexity encoder produces fewer bits because the compression algorithm is more complicated. The needs of each device need to be weighed against the capabilities of the system. For instance, a voice coder like G.711 has a relatively low complexity and therefore requires a relatively higher amount of bandwidth to send data. FAX relay is higher complexity than a G.711 coder and therefore requires more system resources.

Accordingly, each of the channels on the network is analyzed to determine the overall capabilities of the system. If it is determined that the network congestion is high, and the system resource utilization is low, then FAX relay might be used. If the network congestion is low, but the system resource utilization is high, then the voiceband data mode might be used.

Still another case might find both the network being congested, and the processor being overworked. In such a case, the FAX call might simply be dropped. Note that high network utilization implies that bandwidth is not available to carry the FAX call via G.711. Conversely, high resource utilization means that there may not be enough resources to run the complex FAX relay. Accordingly, the entire call might need to be dropped in order to satisfy the system capabilities.

The above example is meant to be illustrative only. Other call events might also be considered, in light of system resource utilization, in order to determine control instructions to send to a portion of the channels or all of the channels.

As before, generally the call event type is detected on inbound signals 530. Any rate change will affect outbound packets, and the system should signal the call resource managers to decrease the bandwidth used by the end devices. Again as before, the end devices might switch voice coders when an egress rate change is detected.

Estimated background noise (derived from source)—The background noise of an inbound signal can be derived from the source without each channel needing to communicate with the central controller. This background noise (alone) can be used to determine whether a channel (in an associated device) should switch from one data rate to another. However, certain advantages might also be derived by considering the system resource utilization of each device on the network.

Figure 6:
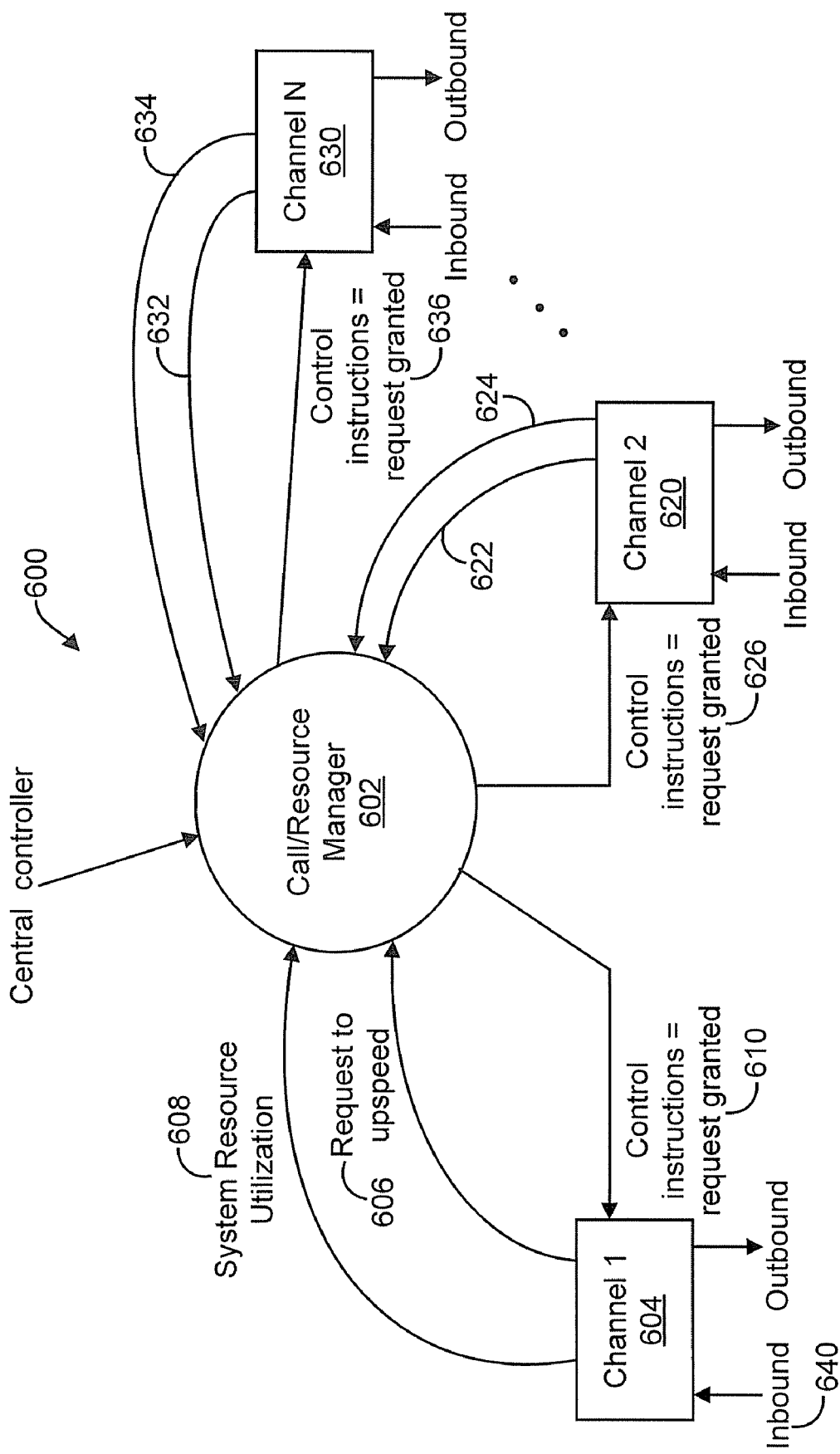
FIG. 6 is a block diagram, according to one aspect of the present invention, of a plurality of channels sending a request to the call/resource manager for upspeed of the data rate, the request being derived from noise information, with control instructions returned based on this information.

FIG. 6 shows an example of certain representative elements 600. An inbound signal 640 (from a source or the like) comes into channel 1 (604). Channel 1 might be running G.723.1 at 5.3 kbps and thereafter detect high background noise conditions (i.e., >−45 dBm). The channel will send a request to upspeed 606 to be considered by the Call/Resource manager 602. The request to upspeed might include a request to switch to G.728 at 16 kbps, or similar data rate, which is higher than the present data rate. The call/resource manager 602 will also consider the system resource utilization 608. This might include processor utilization and/or network utilization. Note that the higher data rate standard will require more bandwidth. If the network utilization is low, then there is bandwidth available for G.728 or the like. If the processor utilization is low, then there is processor bandwidth available for running G.728 or the like. If these representative utilization conditions are satisfied, then the controller grants the request via the control instruction(s) 610. A similar situation is shown for channel 2 (620), with a respective request to upspeed 622 and system resource utilization 624 being sent to the call/resource manager 602. The granting of the request (or not) by the manager 602 is shown, respectively, as 626 and 636.

Figure 7:
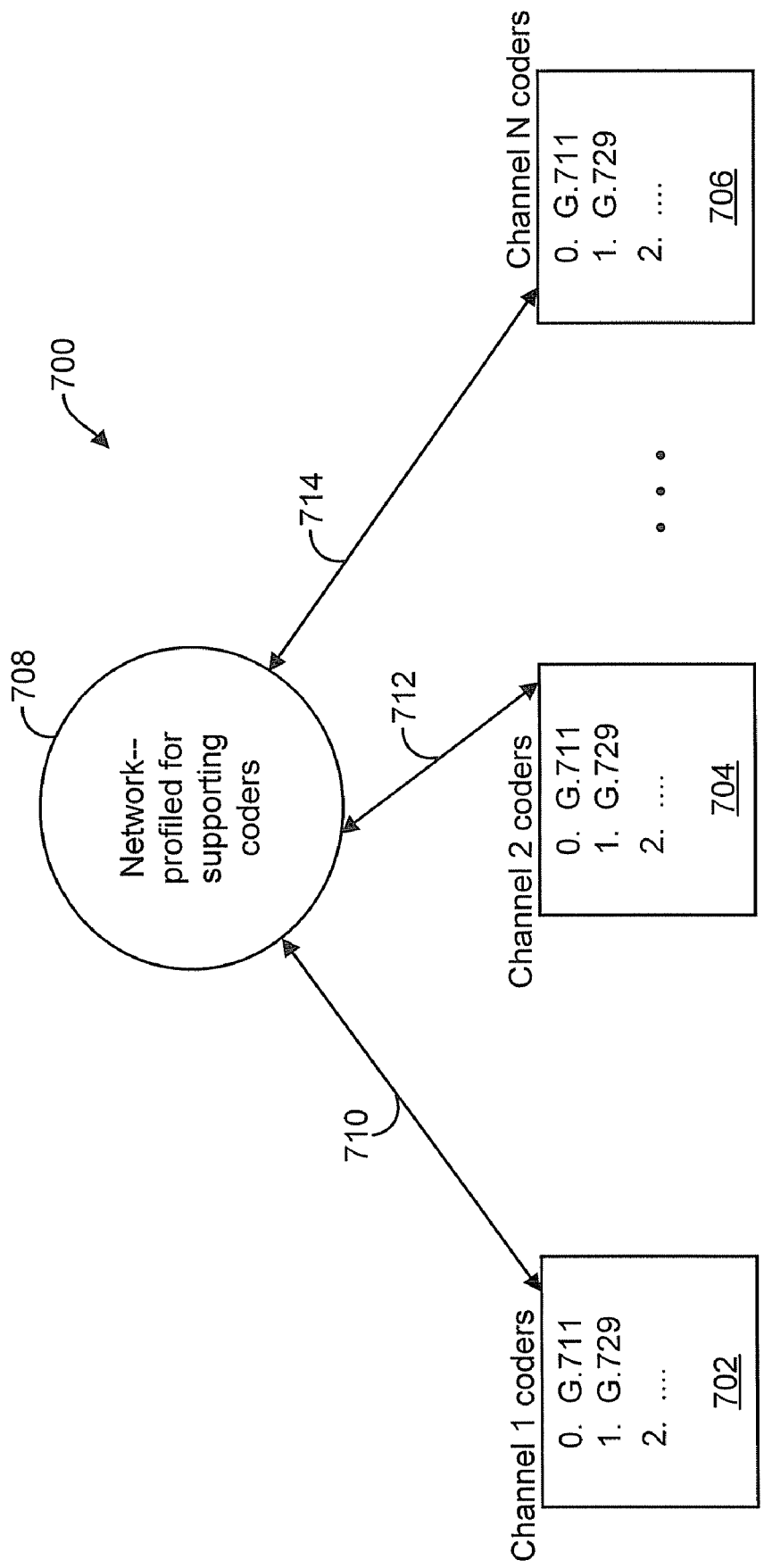
FIG. 7 is a block diagram, according to one aspect of the present invention, of standards being invoked for each of a plurality of channels, according to profiles that satisfy certain network requirements and constraints.

Support for Network Profiles—Still another example might utilize a profile of possible coders that would be supported by a particular network configuration. FIG. 7 shows certain representative elements 700 to illustrate the usage of such profiles. A plurality of channels is shown having at least one channel coder associated with each channel. Generally each channel will have a set of coder standards. Channel 1 (702) is shown to have at least G.711, G.729, and so forth. Channels 2 (704) through N (706) also have these representative coders (while others could be used).

Each path 710, 712, and 714 in the network 708 will have a certain profile of capabilities that have been derived from various factors, including, for instance, the network capability (i.e., each path in the network or the overall network), and the processor resource capabilities of the various devices using the channels. The profiles should be designed so that if each channel chooses to run a certain standard, the network and processor resources will be within the capabilities of the system.

For instance, channel 1 might be running the G.711 standard at 64 kbps. The channel might thereafter detect very low background noise conditions and autonomously switch to a lower rate standard within channel set, such as the G.729 standard, in order to conserve processor/MIPs resources. Channel 2 (704) through channel N (706) might perform similar switching from one standard to another, based upon the background noise associated with each of these channels. The profiles available for each of these coders will provide a workable system configuration for any selected coder, even though the coders are autonomously selected by each separate channel.

By implementing any of these example representations, a higher quality system might be maintained at a lower cost. By sharing resources and trading off network bandwidth, a higher system utilization might be achieved, which in turn can increase quality of the voice/data transmission over a channel.

Although certain exemplary embodiments of the present invention have been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive. It is therefore intended that the following claims be interpreted as covering all such alterations and modifications as fall within the true spirit and scope of the invention.

The invention claimed is:

1. A data rate controller system for providing control instructions for a network, the system comprising:
    a plurality of channels, each channel having at least one associated encoder; and
    a controller operable to receive lost-frame-rate information about each channel, determine if the lost-frame-rate is above a predetermined threshold, determine a type of encoder to be run on each channel based on said lost-frame rate determination, and send a control instruction to each channel to facilitate implementation of the determined encoder, wherein the control instruction causes a lower-rate encoder to be used on at least a portion of the channels.

2. The data rate controller of claim 1, wherein the lower rate encoder is determined to fit within the processor resources of the channel.

3. The data rate controller of claim 2, wherein the lower-rate encoder is determined to fit within the resources of the network.

4. The data rate controller of claim 1, wherein the control instruction causes a lower packetization interval to be used on at least a portion of the channels.

5. The data rate controller of claim 1, wherein the predetermined threshold is approximately two percent.

* * * * *